US 6,646,632 B2

(12) United States Patent
Wegmuller et al.

(10) Patent No.: US 6,646,632 B2
(45) Date of Patent: Nov. 11, 2003

(54) TACTILE FORCE FEEDBACK DEVICE

(75) Inventors: David Wegmuller, Union City, CA (US); Paul Loughnane, Newark, CA (US); David McVicar, El Dorado, CA (US)

(73) Assignee: Logitech Europe S.A. (CH)

( * ) Notice: Subject to any disclaimer, the term of this patent is extended or adjusted under 35 U.S.C. 154(b) by 234 days.

(21) Appl. No.: 09/728,048

(22) Filed: Dec. 1, 2000

(65) Prior Publication Data

US 2002/0067336 A1 Jun. 6, 2002

(51) Int. Cl.[7] .................................................. G09G 5/08
(52) U.S. Cl. ....................... 345/163; 345/157; 345/161; 345/167
(58) Field of Search ................................. 345/156–157, 345/161–163, 167, 184, 701–702

(56) References Cited

U.S. PATENT DOCUMENTS

| | | | | |
|---|---|---|---|---|
| 4,831,359 A | * | 5/1989 | Newell | 345/173 |
| 5,504,502 A | * | 4/1996 | Arita et al. | 345/160 |
| 5,576,704 A | * | 11/1996 | Baker et al. | 341/20 |
| 5,589,828 A | * | 12/1996 | Armstrong | 345/161 |
| 5,714,980 A | * | 2/1998 | Niino | 345/157 |
| 5,889,672 A | | 3/1999 | Schuler et al. | 364/188 |
| 6,057,828 A | | 5/2000 | Rosenberg et al. | 345/156 |
| 6,109,130 A | * | 8/2000 | Will | 340/456 |
| 6,184,868 B1 | * | 2/2001 | Shahoian et al. | 345/156 |
| 6,243,078 B1 | * | 6/2001 | Rosenberg | 345/161 |
| 6,266,046 B1 | * | 7/2001 | Arita | 345/156 |

* cited by examiner

*Primary Examiner*—Steven Saras
*Assistant Examiner*—Michael J Moyer
(74) *Attorney, Agent, or Firm*—Townsend and Townsend and Crew LLP

(57) ABSTRACT

A tactile force feedback apparatus for an input device comprises an inertial member having a movable portion being movable relative to the input device. A magnetically actuatable member is connected to the movable portion of the inertial member. A magnetic driver is configured to generate a magnetic field to move the magnetically actuatable member and the movable portion of the inertial member with respect to the input device to generate tactile force feedback in response to a user's manipulation of the input device. The movable portion of the inertial member may include a contact member movable to strike the input device. The contact member may comprise an elastomeric material, and may be movable to make contact with the input device at a plurality of different contact locations during movement of the contact member.

24 Claims, 7 Drawing Sheets

TACTILE FORCE FEEDBACK DEVICE

BACKGROUND OF THE INVENTION

This invention relates to force feedback devices. In a computer system, a visual environment is shown to a user on a display with which the user can interact to perform functions on the computer through a user manipulable device or an input device such as a mouse, a trackball, a joystick, or the like. The user can interact with the computer to operate a graphical user interface, play a game, perform file manipulation, and the like. The user receives visual and/or audio feedback from the computer during the interaction. Providing force feedback to the user further enhances the user's experience of the simulated or virtual environment created by the computer. For example, the impact of an object against a virtual wall in the simulated environment during user manipulation may produce a force feedback to the user to feel the impact of a hard object against a wall. A force feedback interface device provides physical sensations to the user through the use of computer-controlled actuators in the interface device.

SUMMARY OF THE INVENTION

The present invention is directed to a simple and effective tactile force feedback mechanism for a user manipulable device. In accordance with specific embodiments of the invention, the user manipulable or interface device has the capability to effect tactile screen boundaries, as well as virtual walls which correspond to button bar functions or icon placement on a drag-down menu. For instance, the device may produce force feedback by increasing and decreasing resistance to further manipulation or movement of the interface device by the user or by aiding motion of the interface device, by increasing and decreasing the vibration or impact force sensed by the user's hand on the interface device.

In accordance with an aspect of the present invention, a tactile force feedback apparatus for an input device comprises an inertial member having a movable portion being movable relative to the input device. A magnetically actuatable member is connected to the movable portion of the inertial member. A magnetic driver is configured to generate a magnetic field to move the magnetically actuatable member and the movable portion of the inertial member with respect to the input device to generate tactile force feedback in response to a user's manipulation of the input device.

In some embodiments, the magnetically actuatable member is a permanent magnet or a metallic member. The magnetic drive comprises an electromagnet fixed to the input device. The magnetically actuatable member is connected to the movable portion of the inertial member to be movable by the magnetic driver in a generally linear manner. The movable portion of the inertial member comprises a contact member movable to strike the input device. The contact member of the inertial member is movable between two surfaces of the input device to strike at least one of the two surfaces. The magnetic driver may be configured to generate a magnetic field in synchronization with a graphical user interface.

In accordance with another aspect of the invention, a tactile force feedback apparatus for an input device comprises an inertial member having an attachment portion attached to the input device and a movable portion being movable relative to the input device. A magnetically actuatable member is connected to the movable portion of the inertial member and being movable with respect to the input device in a substantially linear manner by a magnetic field generated in response to a user's manipulation of the input device to move the movable portion of the inertial member to produce tactile force feedback.

In accordance with another aspect of the present invention, a tactile force feedback apparatus for an input device comprises an inertial member having a movable portion being movable relative to the input device. A contact member is connected to the movable portion of the inertial member. A magnetically actuatable member is connected to the movable portion of the inertial member and being movable with respect to the input device by a magnetic field generated in response to a user's manipulation of the input device to move the contact member and the movable portion of the inertial member to produce tactile force feedback in a contact mode and in a noncontact mode. The contact member makes contact with the input device during movement in the contact mode. The contact member moves in vibration without contacting the input device during movement in the noncontact mode.

In some embodiments, the contact member comprises an elastomeric material. The contact member is movable to make contact with the input device at a plurality of different contact locations during movement of the contact member. The input device comprises an elastomeric material in at least one of the contact locations. The contact member comprises different contact portions for making contact with different contact locations of the input device, and wherein the different contact portions comprise different elastomeric materials. The different elastomeric materials have different durometer levels.

DESCRIPTION OF THE SPECIFIC EMBODIMENTS

FIGS. 1–5 show a mouse device 10 which includes a tactile force feedback (FFB) mechanism. It is understood that the present FFB mechanism may be implemented in other input devices, pointing devices, user manipulable devices, user interface devices, and the like. In the embodiments shown, the FFB mechanism produces a single axis tactile force feedback oriented generally perpendicular to the operating plane of the device. Of course, the mechanism may be modified to produce different feedback configurations without departing from the scope of the invention.

Figure 1:
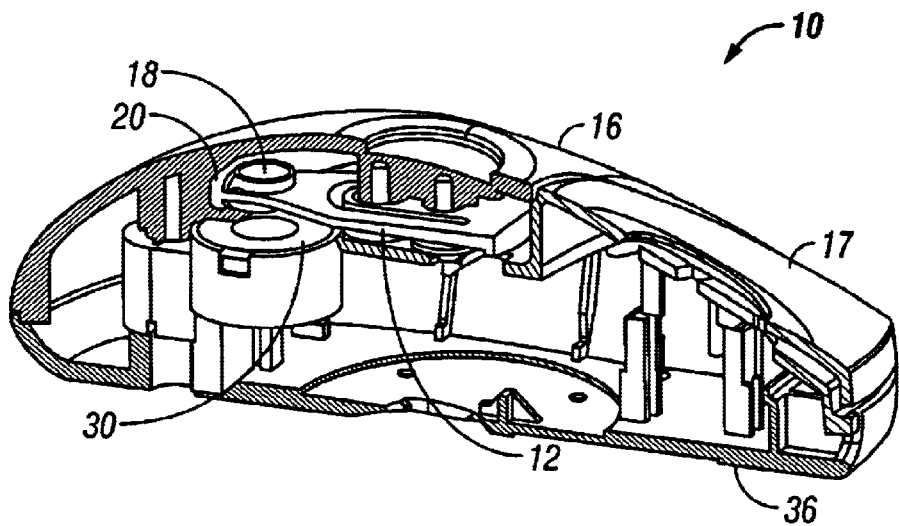
FIG. 1 is a perspective sectional view of a mouse device having a tactile force feedback mechanism according to one embodiment of the present invention.
Figure 2:
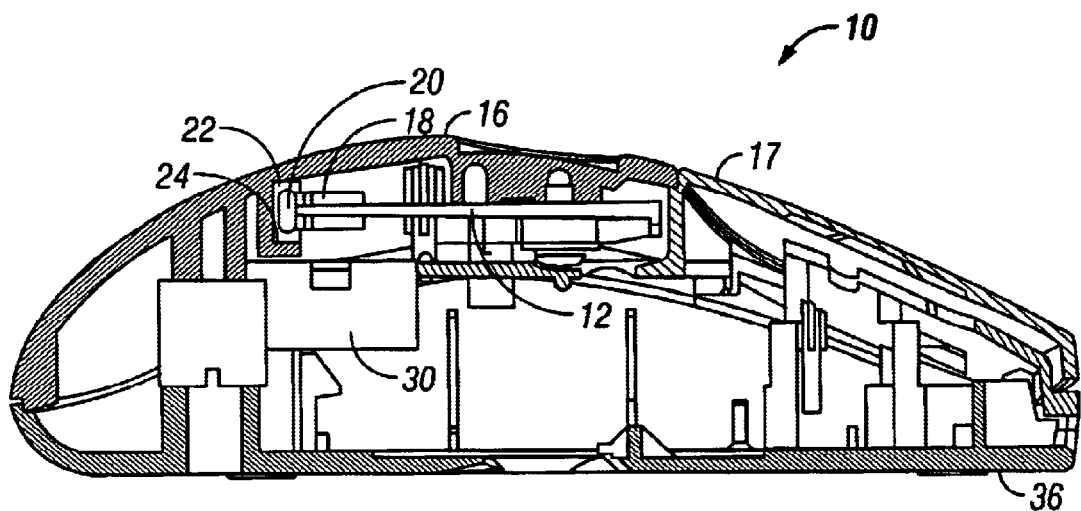
FIG. 2 is a front sectional view of the mouse device of FIG. 1.
Figure 3:
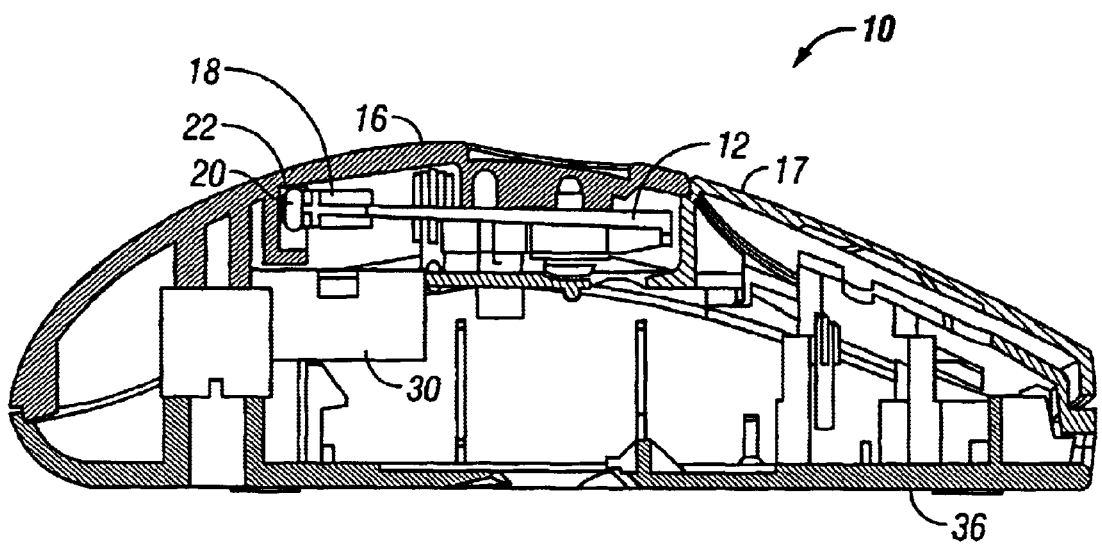
FIG. 3 is a front sectional view of the mouse device of FIG. 1 illustrating a top striking position of the inertial member.
Figure 4:
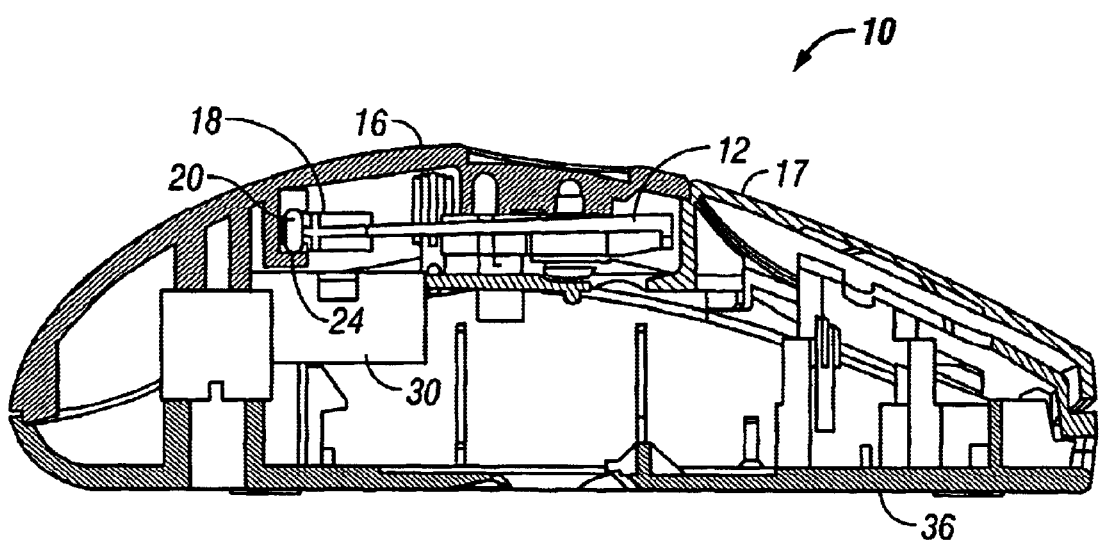
FIG. 4 is a front sectional view of the mouse device of FIG. 1 illustrating a bottom striking position of the inertial member.
Figure 5:
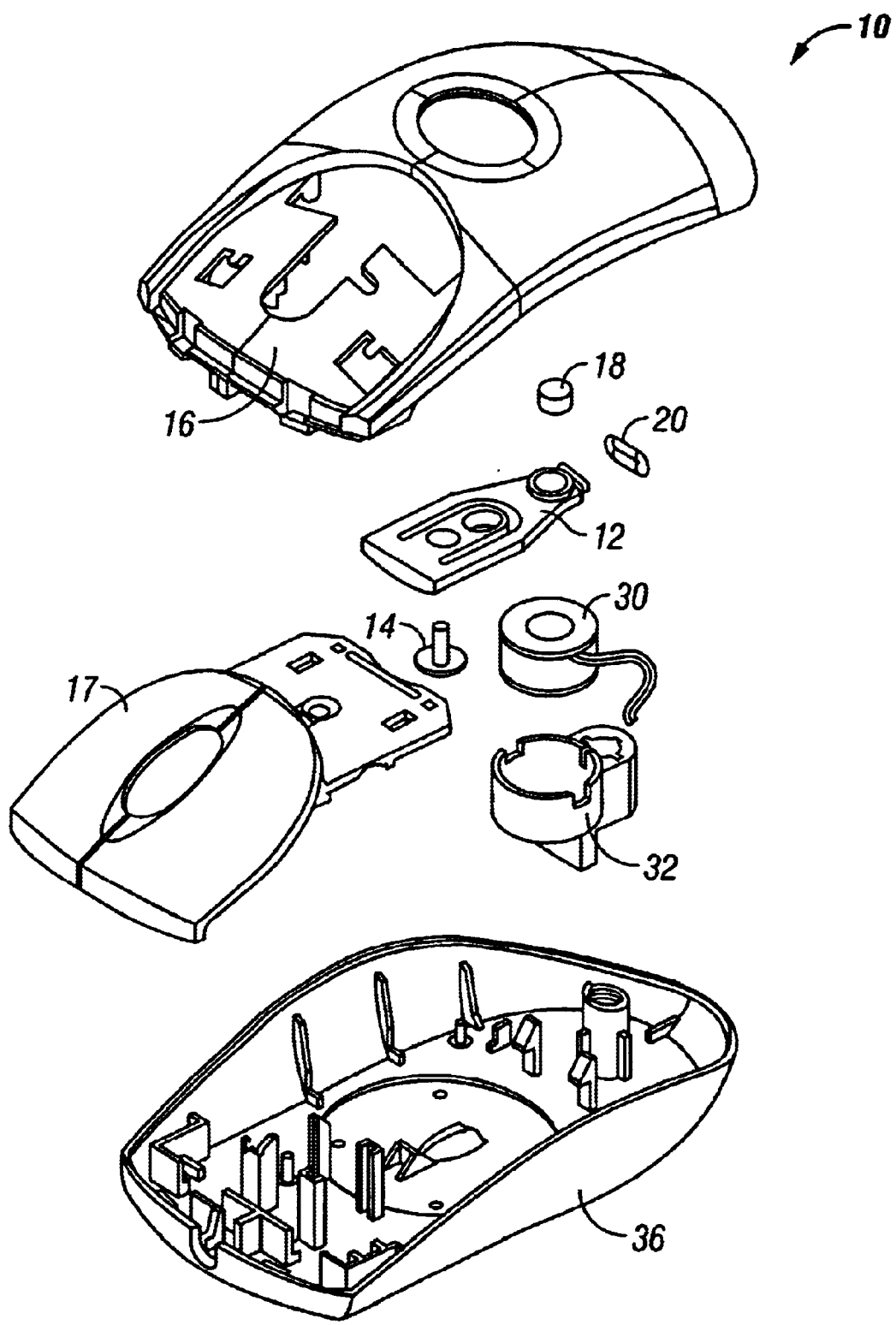
FIG. 5 is an exploded perspective view of the mouse device of FIG. 1.

The FFB mechanism causes an inertial member 12 to move and produce tactile FFB. The inertial member 12 shown is an arm having one end attached to the upper case 16 of the mouse device 10, for instance, by a fastener 14 as shown in FIG. 5. A key button plate 17 is also attached to the upper case 16. Near the free end of the arm 12 is an actuatable member 18 and a contact member 20, as best seen in FIGS. 1–4. In a specific embodiment, the actuatable member is a permanent magnet 18. The arm 12 is preferably flexible to permit the free end to move in flexion. The contact member 20 desirably is a resilient, deformable member which may include an elastomer material or the like. In a specific embodiment, the contact member 20 is an elastomeric O-ring, as shown in FIG. 5. The free end of the arm 12 is disposed in a structure which restricts its movement within a specific range. As shown in FIG. 2, the contact member 20 is movable between an upper limit or top side 22 and a lower limit or bottom side 24 in a structure connected to or formed integrally with the upper case 16. The arm 12 is in a default or undeformed position in FIG. 2 with the contact member 20 spaced between the upper limit 22 and lower limit 24. FIG. 3 shows the contact member 20 at the upper limit 22, and FIG. 4 shows the contact member 20 at the lower limit 24.

The actuatable member 18 is actuated to produce movement of the arm 12. In the specific embodiment shown, the permanent magnet 18 is caused to move up and down by attraction and repulsion generated by an electromagnet 30. The electromagnet 30 typically includes a coil surrounding a metallic core. In a specific embodiment, the metallic core is circular cylindrical. The electromagnet 30 is desirably supported in a housing 32 which is fixed on the lower case 36 of the mouse device 10. The electromagnet 30 is stationary on the device 10, and the FFB is produced by movement of the inertial arm 12 as driven by the movable magnet 18. It produces a magnetic field that may be fluctuated in both intensity and frequency to manipulate the permanent magnet 18, for instance, in response to inputs from a host computer and in synchronization with the graphical interface. The position and frequency of the arm 12 as set in motion by the interaction between the electromagnet 30 and the permanent magnet 18 may cause the contact member 20 to strike only the top side 22, only the bottom side 24, both the top and bottom sides 22, 24, or neither. The striking of the device case by the contact member 20 imparts a tactile FFB felt by the user. In the case of no contact between the contact member 20 and the top and bottom sides of the device case, the mechanism creates a vibration within the device 10 without direct contact. This vibration is transferred through the inertial arm 12 to the point of attachment to the upper case 16 at the fixed end. The contactless vibration produces a different tactile FFB to the user from that generated by striking the device case.

Figure 5A:
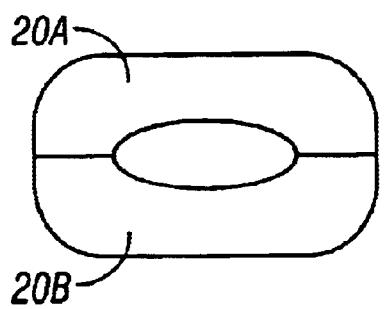
FIG. 5a is a schematic view of the contact member according to an another embodiment of the present invention.
Figure 5B:
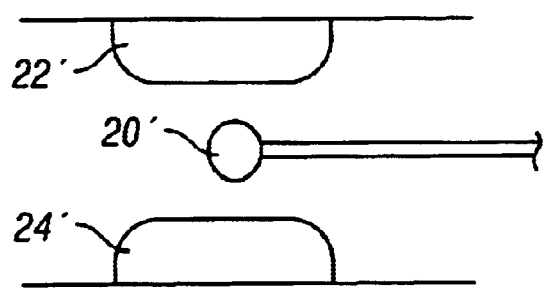
FIG. 5b is a schematic view of the top and bottom sides adjacent the contact member according to another embodiment of the present invention.

The use of elastomeric material for the contact member 20 in striking the top side 22 and/or bottom side 24 may produce a more desirable (e.g., quieter and softer) tactile FFB than that produced by contact between a hard contact member and hard sides. In another embodiment as shown in FIG. 5a, the contact member 20 includes an upper elastomer 20a and a lower elastomer 20b of different durometer to produce different FFB sensations. The upper elastomer 20a may impact the top side 22 imparting a sharper feel due to a higher durometer material, and the lower elastomer 20b may produce a softer and quieter impact to the bottom side 24 with a lower durometer material, or vice versa. The use of different materials creates a larger variety of tactile experiences to the user to support and simulate different graphical interfaces. In another embodiment shown in FIG. 5b, the contact member 20' may be made of a hard material, and is configured to strike an elastomeric top side 22' and/or an elastomeric bottom side 24'.

Figure 5C:
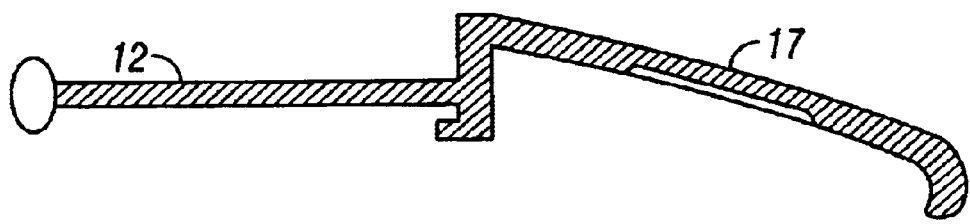
FIG. 5c is a sectional view of the inertial arm integrally formed with the key button plate according to another embodiment of the present invention.

The configuration of the tactile FFB mechanism of FIGS. 1–5 is simple in structure and fits easily into the mouse device 10. In an alternative embodiment as shown in FIG. 5c, the arm 12 may be integrally formed with the key button plate 17 to form a unitary piece, for instance, by molding.

Figure 5D:
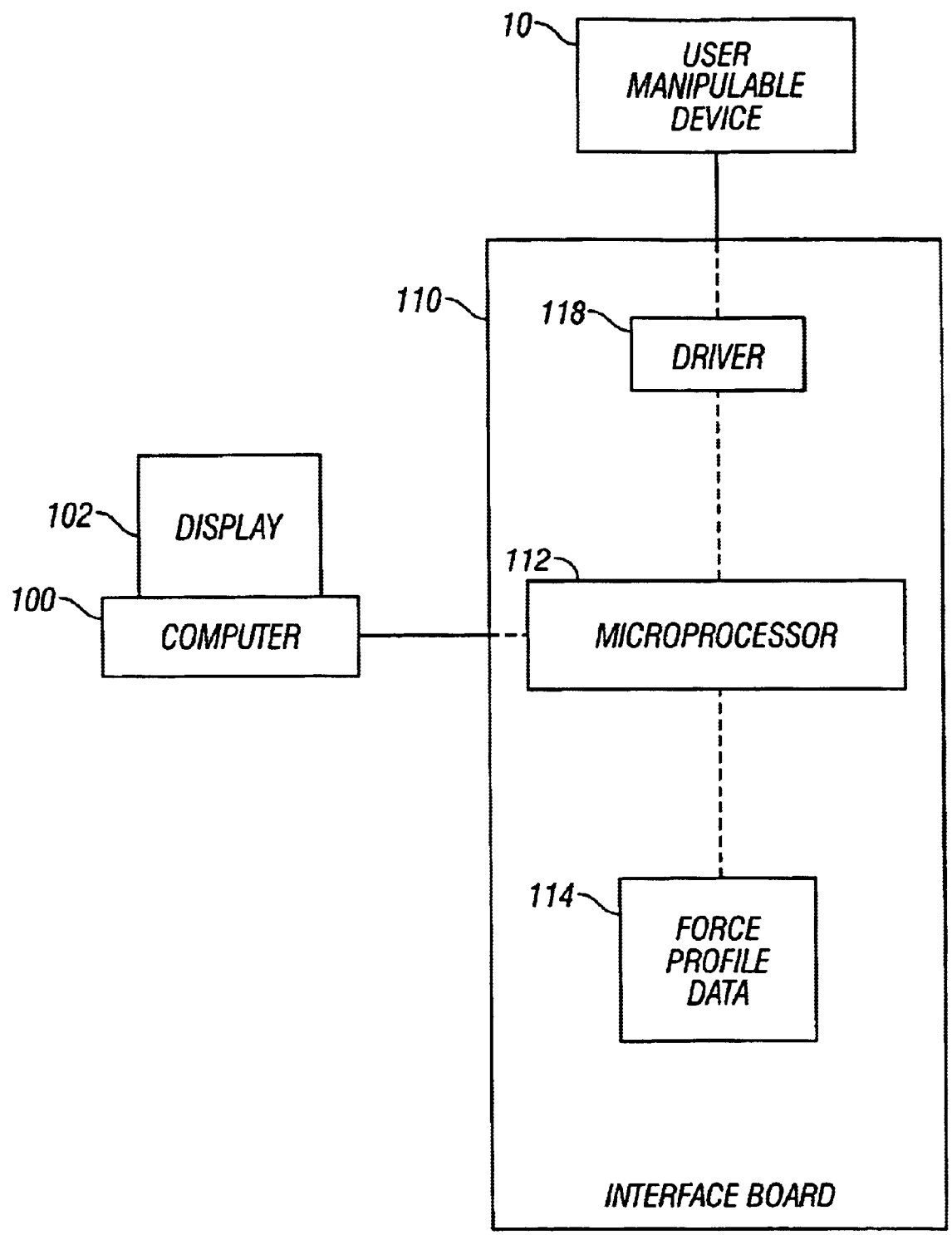
FIG. 5d is a block diagram illustrating the interface between the user manipulable device and a computer according to an embodiment of the present invention.

FIG. 5d shows a block diagram illustrating the interface of the user manipulable device 10 and a computer 100 having a display 102. The computer 100 typically is configured to accept an interface board 110 which includes the modules for electronically interfacing with the user manipulable device 10. The interface board 110 may reside in an I/O slot of the computer 100. The interface board 110 includes a microprocessor 112 which communicates with the computer 100. The microprocessor 112 accesses force profile information from data storage 114 which is provided as a function of the coordinate position on the display 102. The force profile information specifies the force to be applied by or to the force device of the user manipulable device 10. The force typically is a function of the position of the cursor on the screen display 102 and a function of the particular screen display on which the cursor is being manipulated. For example, the force profile information may relate to the tactile responsiveness of the device 10 to the graphical user interface or screen display of the application. Based on the force profile information and the measured position of the cursor on the display 102, the microprocessor 112 directs a power driver 118 to drive the user manipulable device 10 to produce force feedback. The power driver 118 may, for instance, control the electromagnet 30 to generate the desired magnetic field to move the magnet and inertial member in the device 10. In one example, the electromagnet 42 of the device 10 as directed by the driver 117 generates a magnetic field varying in intensity and frequency in response to inputs from the host computer 100 and in synchronization with the graphical user interface. The force feedback produced in the user manipulable device 10 may effect tactile screen boundaries, as well as virtual walls which correspond to button bar functions or icon placement on a drag-down menu, by increasing and decreasing the vibration or impact force sensed by the user's hand on the interface device 10.

Figure 6:
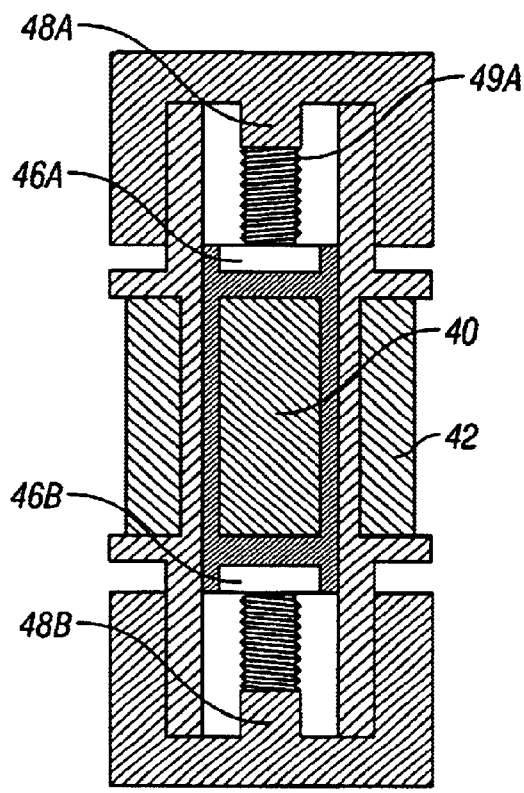
FIG. 6 is a sectional view of a tactile force feedback mechanism according to another embodiment of the present invention.

FIG. 6 shows yet another embodiment of the tactile FFB mechanism. A permanent magnet 40 is movably disposed in a hollow core of an electromagnet 42 fixed to the device. The electromagnet 42 generates a magnetic field varying in intensity and frequency in response to inputs from a host computer and in synchronization with the graphical interface. The electromagnet 42 typically includes a coil surrounding the magnet 40. When the coil is energized, the magnet moves up or down depending on the polarity of the field generated by the coil. The magnetic field causes the magnet 40 to slide up and down in the hollow core. The ends 46a, 46b of the sliding magnet 40 may impact the upper case portion 48a, the lower case portion 48b, or both, to produce different tactile forces, or the sliding magnet 40 may only vibrate between the case portions 48a, 48b without making contact so as to produce pure vibration. The ends 46a, 46b may include an elastomeric material. Alternatively or additionally, the case portions 48a, 48b may include an elastomeric material. Springs 49a, 49b are desirably provided to support and space the moving magnet 40 between the case portions 48a, 48b in a neutral position. The electromagnetic forces generated by the electromagnet 42 overcomes the spring forces to drive the moving magnet 40 up and down. The mechanism of FIG. 6 may be more compact than the mechanism of FIGS. 1–5.

Figure 7:
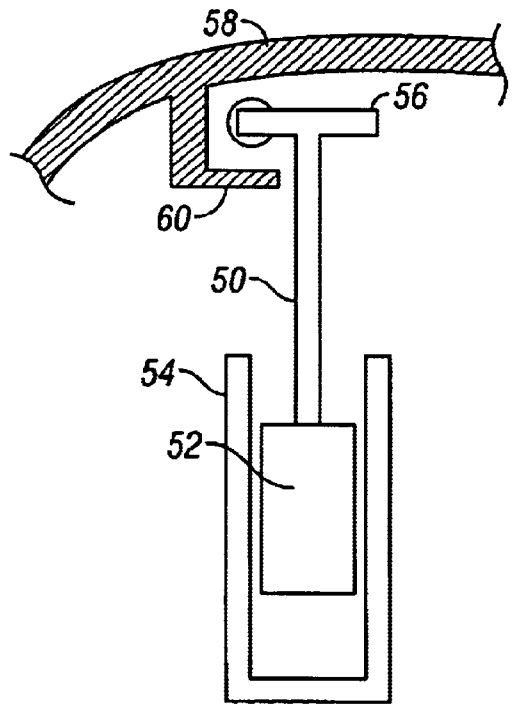
FIG. 7 is a sectional view of a tactile force feedback mechanism according to another embodiment of the present invention.

In an alternative embodiment shown in FIG. 7, a shaft 50 extends from the moving magnet 52 driven by the electromagnet 54 to move up and down. The contact member 56 is connected to the end of the shaft 50 to move between a top surface 58 and a bottom surface 60. The shaft 50 and the moving magnet 52 form the inertial member, while the electromagnet 54 is fixed to the device.

Figure 8:
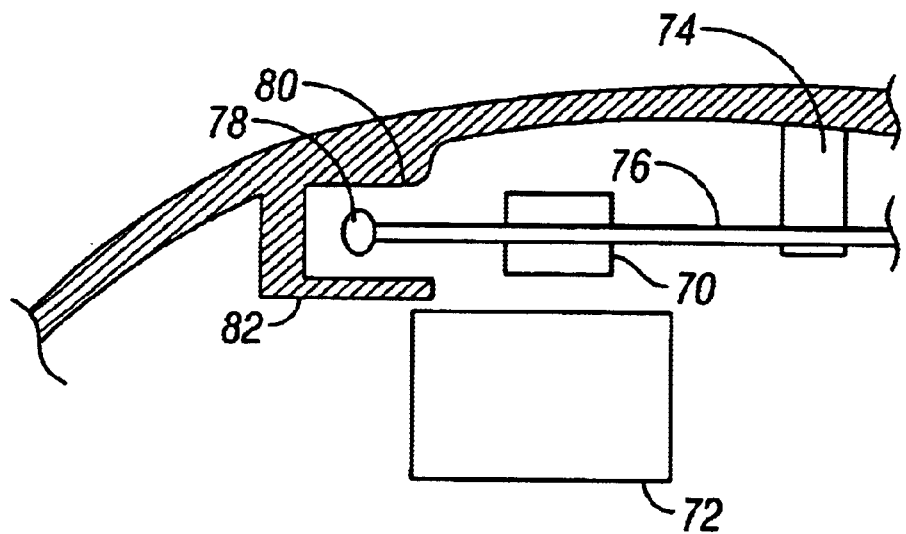
FIG. 8 is a sectional view of a tactile force feedback mechanism according to another embodiment of the present invention.

In FIG. 8, a nonmagnetic metal slug 70 is used instead of a permanent magnet. The metal slug 70 is spring loaded away from the face of the electromagnet 72 by a spring 74. The spring 74 biases the inertial arm 76 and the contact member 78 at the free end thereof toward the upper case surface 80. The electromagnet 72 only has to attract the metal slug 70 to move it toward the lower case surface 82. When the attractive force on the metal slug 70 is removed, the biasing force of the spring 74 returns the metal slug 70 to a position toward the upper case surface 80. The position of the metal slug 70, the spring constant of the spring 74, and the intensity and frequency of the electromagnet 72 can be selected to cause the contact member 78 to strike the upper case surface 80, the lower case surface 82, or both, or to vibrate without impact. The device of FIG. 8 is simpler and typically less expensive to produce.

Figure 9:
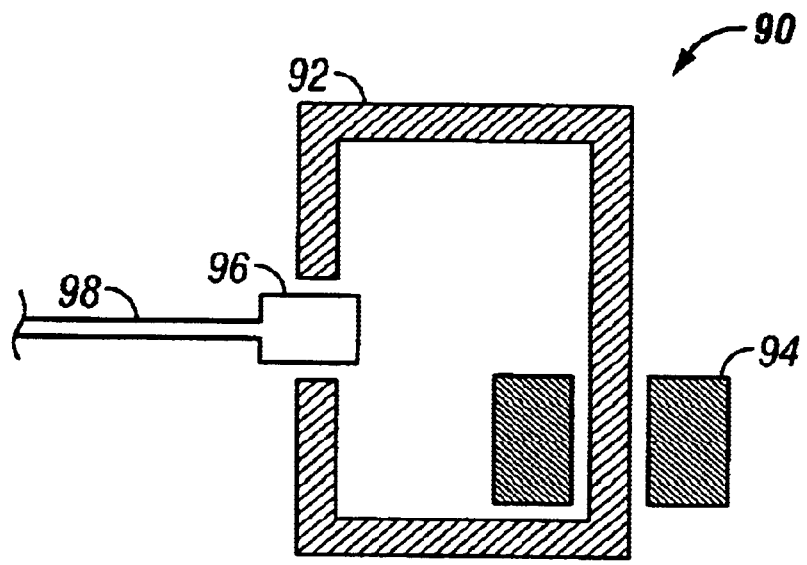
FIG. 9 is a sectional view of a tactile force feedback mechanism according to another embodiment of the present invention.

The above-described arrangements of apparatus and methods are merely illustrative of applications of the principles of this invention and many other embodiments and modifications may be made without departing from the spirit and scope of the invention as defined in the claims. As illustrated by the above examples, there are different ways of configuring and modifying the tactile FFB mechanism according to the present invention. In yet another example as shown in FIG. 9, an electromagnet 90 has a C-shaped core 92 movable by the magnetic field generated by a coil 94. The permanent magnet 96 coupled to the arm 98 is disposed between the ends of the C-shaped core 92 and moves with the core 92 up and down when the coil 94 is energized. The C-shaped core 92 uses the magnetic energy efficiently to move the magnet 96. The coil 94 can be disposed at different locations relative to the core 92. This may simplify the design and allows for variation in size and shape of the mechanism. The scope of the invention should, therefore, be determined not with reference to the above description, but instead should be determined with reference to the appended claims along with their full scope of equivalents.

What is claimed is:

1. A tactile force feedback apparatus for an input device, the apparatus comprising:
   an inertial member having a movable portion being movable relative to the input device;
   a magnetically actuatable member connected to the movable portion of the inertial member; and
   a magnetic driver configured to generate a magnetic field to move the magnetically actuatable member and the movable portion of the inertial member with respect to the input device to produce a vibration from movement of the movable portion of the inertial member to generate tactile force feedback in response to a user's manipulation of the input device;
   wherein the inertial member comprises an attachment portion attached to the input device; and
   wherein the inertial member comprises a longitudinal body having an end attached to the input device as the attachment portion and having a free end as the movable portion.

2. The apparatus of claim 1 wherein the magnetically actuatable member is selected from the group consisting of a permanent magnet and a metallic member.

3. The apparatus of claim 1 wherein the magnetic drive comprises an electromagnet fixed to the input device.

4. The apparatus of claim 1 wherein the magnetically actuatable member is connected to the movable portion of the inertial member to be movable by the magnetic driver in a generally linear manner.

5. The apparatus of claim 1 wherein the movable portion of the inertial member comprises a contact member movable to strike the input device.

6. The apparatus of claim 5 wherein the contact member of the inertial member is movable between two surfaces of the input device to strike at least one of the two surfaces.

7. The apparatus of claim 5 wherein the contact member comprises an elastomeric material.

8. The apparatus of claim 1 wherein the magnetic driver is configured to generate a magnetic field in synchronization with a graphical user interface.

9. The apparatus of claim 1 wherein the attachment portion of the inertial member is connected to a key button plate of the input device.

10. A tactile force feedback apparatus for an input device, the apparatus comprising:
    an inertial member having a movable portion being movable relative to the input device;
    a contact member connected to the movable portion of the inertial member; and
    a magnetically actuatable member connected to the movable portion of the inertial member and being movable with respect to the input device by a magnetic field generated in response to a user's manipulation of the input device to move the contact member and the movable portion of the inertial member to produce a vibration from movement of the movable portion of the inertial member to generate tactile force feedback in a contact mode and in a noncontact mode, the contact member making contact with the input device during movement in the contact mode, the contact member moving in vibration without contacting the input device during movement in the noncontact mode;
    wherein the contact member comprises an elastomeric material.

11. The apparatus of claim 10 wherein the contact member is movable to make contact with the input device at a plurality of different contact locations during movement of the contact member.

12. The apparatus of claim 11 wherein the input device comprises an elastomeric material in at least one of the contact locations.

13. The apparatus of claim 11 wherein the contact member comprises different contact portions for making contact with different contact locations of the input device, and wherein the different contact portions comprise different elastomeric materials.

14. The apparatus of claim 13 wherein the different elastomeric materials have different durometer levers.

15. A tactile force feedback apparatus for an input device, the apparatus comprising:

an inertial member having a movable portion being movable relative to the input device;

a magnetically actuatable member connected to the movable portion of the inertial member; and a magnetic driver configured to generate a magnetic field to move the magnetically actuatable member and the movable portion of the inertial member with respect to the input device to produce a vibration from movement of the movable portion of the inertial member to generate tactile force feedback in response to a user's manipulation of the input device;

wherein the movable portion of the inertial member comprises a contact member movable to strike the input device; and wherein the contact member of the inertial member is movable between two surfaces of the input device to strike at least one of the two surfaces.

16. The apparatus of claim 15 wherein the inertial member comprises an attachment portion attached to the input device.

17. The apparatus of claim 16 wherein the attachment portion of the inertial member is connected to a key button plate of the input device.

18. The apparatus of claim 15 wherein the magnetic driver is configured to generate a magnetic field in synchronization with a graphical user interface.

19. The apparatus of claim 15 wherein the contact member comprise s an elastomeric material.

20. A tactile force feedback apparatus for an input device, the apparatus comprising:

an inertial member having a movable portion being movable relative to the input device;

a contact member connected to the movable portion of the inertial member; and a magnetically actuatable member connected to the movable portion of the inertial member and being movable with respect to the input device by a magnetic field generated in response to a user's manipulation of the input device to move the contact member and the movable portion of the inertial member to produce a vibration from movement of the movable portion of the inertial member to generate tactile force feedback in a contact mode and in a noncontact mode, the contact member making contact with the input device during movement in the contact mode, the contact member moving in vibration without contacting the input device during movement in the noncontact mode;

wherein the contact member is movable to make contact with the input device at a plurality of different contact locations during movement of the contact member.

21. The apparatus of claim 20 wherein the input device comprises an elastomeric in at least one of the contact locations.

22. The apparatus of claim 20 wherein the contact member comprises different contact portions for making contact with different contact locations of the input device, and wherein the different contact portions comprise different elastomeric materials.

23. The apparatus of claim 22 wherein the different elastomeric materials have different durometer levels.

24. A tactile force feedback apparatus for an input device, the apparatus comprising:

an inertial member having a movable portion being movable relative to the input device;

a magnetically actuatable member connected to the movable portion of the inertial member; and a magnetic driver configured to generate a magnetic field to move the magnetically actuatable member and the movable portion of the inertial member with respect to the input device to produce a vibration from movement of the movable portion of the inertial member to generate tactile force feedback in response to a user's manipulation of the input device;

wherein the movable portion of the inertial member comprises a contact member movable to strike the input device; and wherein the contact member comprises an elastomeric material.

* * * * *